US009178765B2

(12) United States Patent
Ling et al.

(10) Patent No.: US 9,178,765 B2
(45) Date of Patent: Nov. 3, 2015

(54) METHOD AND SYSTEM FOR A HIGH CAPACITY CABLE NETWORK

(71) Applicant: MaxLinear, Inc., Carlsbad, CA (US)

(72) Inventors: Curtis Ling, Carlsbad, CA (US);
Sridhar Ramesh, Carlsbad, CA (US);
Timothy Gallagher, Encinitas, CA (US)

(73) Assignee: MAXLINER, INC., Carlsbad, CA (US)

(*) Notice: Subject to any disclaimer, the term of this patent is extended or adjusted under 35 U.S.C. 154(b) by 140 days.

(21) Appl. No.: 13/948,401

(22) Filed: Jul. 23, 2013

(65) Prior Publication Data

US 2014/0022926 A1 Jan. 23, 2014

Related U.S. Application Data

(60) Provisional application No. 61/674,733, filed on Jul. 23, 2012.

(51) Int. Cl.
| | |
|---|---|
| *H04L 12/26* | (2006.01) |
| *H04L 12/24* | (2006.01) |
| *H04L 12/28* | (2006.01) |
| *H04L 1/00* | (2006.01) |
| *H04L 5/00* | (2006.01) |
| *H04L 27/26* | (2006.01) |

(52) U.S. Cl.
CPC ............ *H04L 41/083* (2013.01); *H04L 1/0003* (2013.01); *H04L 1/0009* (2013.01); *H04L 5/006* (2013.01); *H04L 5/0046* (2013.01); *H04L 12/2801* (2013.01); *H04L 12/2898* (2013.01); *H04L 27/2646* (2013.01)

(58) Field of Classification Search
None
See application file for complete search history.

(56) References Cited

U.S. PATENT DOCUMENTS

| | | | | |
|---|---|---|---|---|
| 8,144,720 | B2 * | 3/2012 | Koorapaty et al. | 370/430 |
| 2003/0126254 | A1 * | 7/2003 | Cruickshank et al. | 709/224 |
| 2005/0107045 | A1 * | 5/2005 | Kroeger | 455/83 |
| 2005/0122996 | A1 * | 6/2005 | Azenkot et al. | 370/477 |
| 2006/0045002 | A1 * | 3/2006 | Lee | 370/208 |
| 2006/0107174 | A1 * | 5/2006 | Heise | 714/755 |
| 2006/0133805 | A1 * | 6/2006 | Jang et al. | 398/26 |
| 2007/0280339 | A1 * | 12/2007 | Oksman | 375/222 |
| 2008/0233901 | A1 * | 9/2008 | Ebiko et al. | 455/114.2 |
| 2009/0003468 | A1 * | 1/2009 | Karabulut et al. | 375/260 |
| 2009/0215403 | A1 * | 8/2009 | Currivan et al. | 455/69 |

(Continued)

OTHER PUBLICATIONS

Chapman, John T. et al., "Mission is Possible: An Evolutionary Approach to Gigabit-Class DOCSIS", NCTA 2012 (86 pages).

*Primary Examiner* — Otis L Thompson, Jr.
(74) *Attorney, Agent, or Firm* — McAndrews, Held & Malloy, Ltd.

(57) ABSTRACT

A cable modem termination system (CMTS) may communicate with a plurality of cable modems using a plurality of orthogonal frequency division multiplexed (OFDM) subcarriers. The CMTS may determine a performance metric of each of the cable modems. For each of the OFDM subcarriers and each of the cable modems, the CMTS may select physical layer parameters to be used for communication with that cable modem on that OFDM subcarrier based on a performance metric of that cable modem. The parameters may be selected for each individual modem and/or each individual subcarrier, or may be selected for groups of modems and/or groups of subcarriers. The parameters may include, for example, one or more of: transmit power, receive sensitivity, timeslot duration, modulation type, modulation order, forward error correction (FEC) type, and FEC code rate.

22 Claims, 8 Drawing Sheets

(56) References Cited

U.S. PATENT DOCUMENTS

| | | | |
|---|---|---|---|
| 2010/0100919 A1* | 4/2010 | Hsue et al. | 725/111 |
| 2010/0111021 A1* | 5/2010 | Hui | 370/329 |
| 2010/0316163 A1* | 12/2010 | Forenza et al. | |
| 2013/0004179 A1* | 1/2013 | Nielsen et al. | 398/115 |
| 2013/0236177 A1* | 9/2013 | Fang et al. | 398/66 |
| 2014/0010269 A1* | 1/2014 | Ling et al. | 375/222 |
| 2014/0022943 A1* | 1/2014 | Ling et al. | 370/254 |
| 2014/0133330 A1* | 5/2014 | Chapman | 370/252 |
| 2014/0133497 A1* | 5/2014 | Chapman | 370/474 |
| 2014/0282783 A1* | 9/2014 | Totten et al. | 725/111 |

* cited by examiner

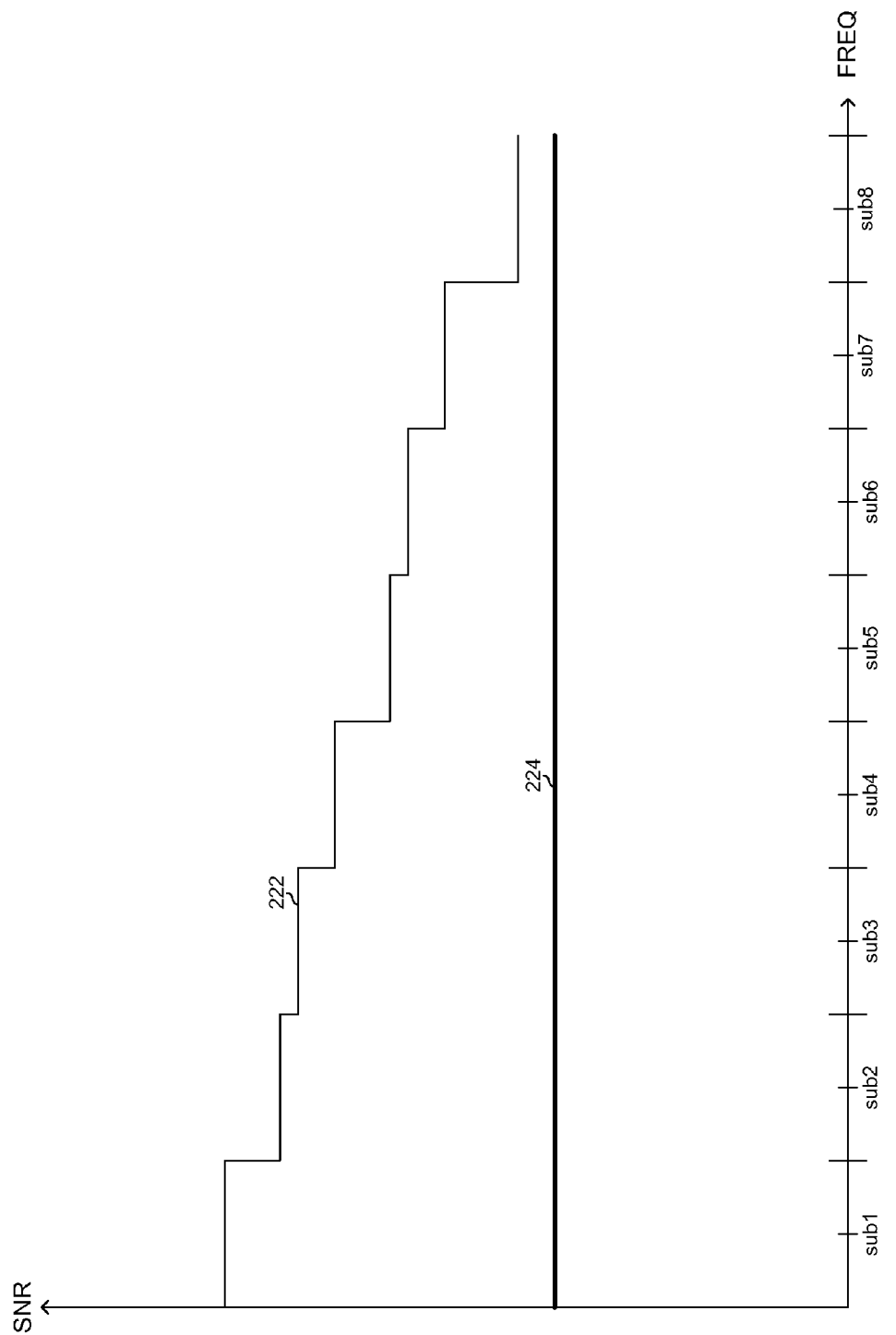

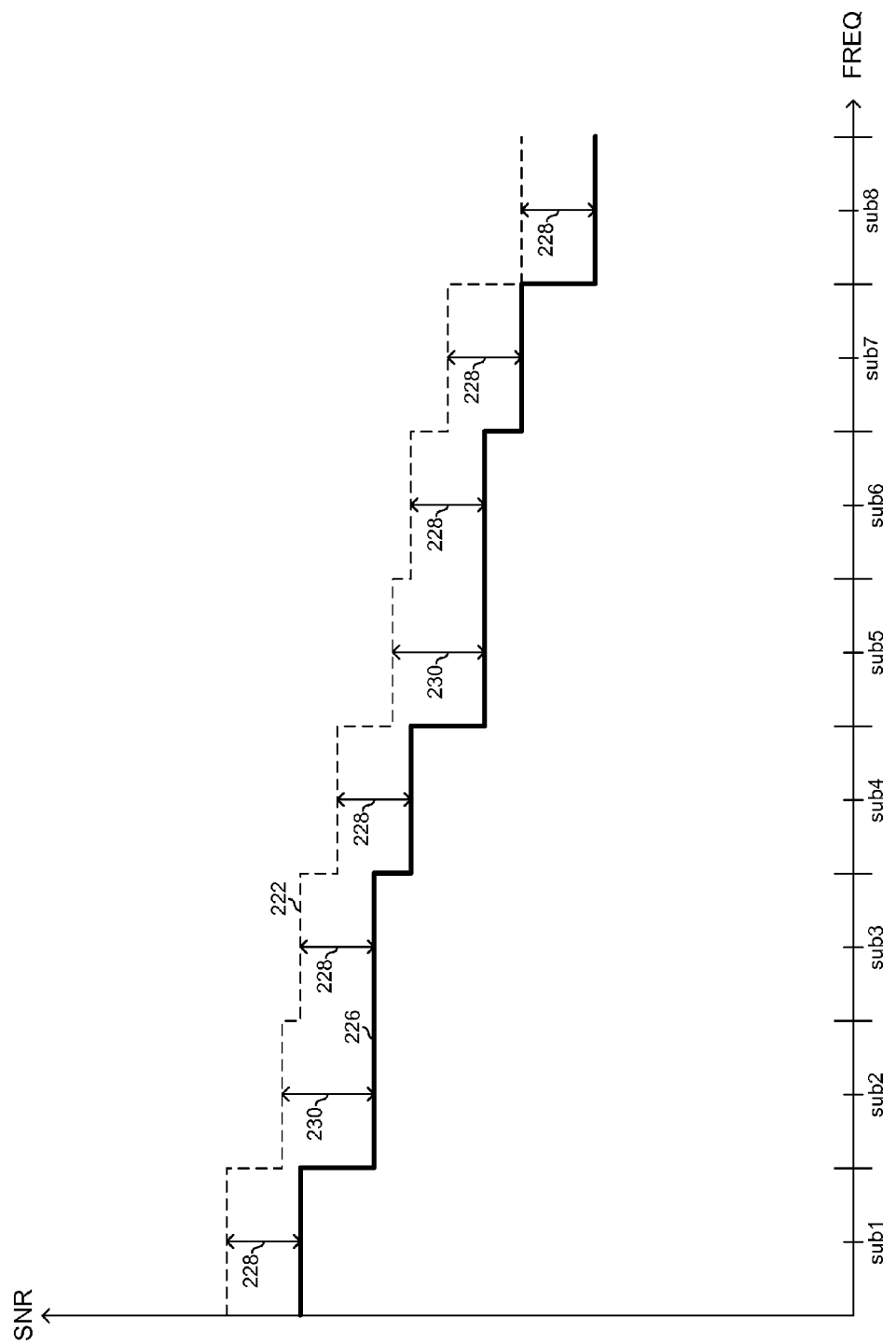

METHOD AND SYSTEM FOR A HIGH CAPACITY CABLE NETWORK

PRIORITY CLAIM

This patent application makes reference to, claims priority to and claims benefit from U.S. Provisional Patent Application Ser. No. 61/674,733 titled "Method and System for a High Capacity Television Network" and filed on Jul. 23, 2012.

The entirety of the above-mentioned application is hereby incorporated herein by reference.

INCORPORATION BY REFERENCE

This application also makes reference to:
U.S. patent application Ser. No. 13/553,328 titled "Method and System for Client-Side Message Handling in a Low-Power Wide Area Network," and filed on Jul. 19, 2012;
U.S. patent application Ser. No. 13/485,034 titled "Method and System for Server-Side Message Handling in a Low-Power Wide Area Network," and filed on May 31, 2012;
U.S. Pat. No. 8,711,750 titled "Method and System for a Low-Power Client in a Wide Area Network," and filed on Jul. 19, 2012;
U.S. Pat. No. 8,687,535 titled "Method and System for Server-Side Handling of a Low-Power Client in a Wide Area Network," and filed on Jul. 19, 2012;
U.S. patent application Ser. No. 13/948,417 titled "Method and System for Noise Suppression in a Cable Network," and filed on Jul. 23, 2013; and
U.S. patent application Ser. No. 13/948,444 titled "Method and System for Service Group Management in a Cable Network," and filed on Jul. 23, 2013.

The entirety of each of the above-mentioned applications is hereby incorporated herein by reference.

FIELD OF THE INVENTION

Certain embodiments of the invention relate to cable/DOCSIS networks. More specifically, certain embodiments of the invention relate to a method and system for a high-capacity cable/DOCSIS network.

BACKGROUND OF THE INVENTION

Conventional cable/DOCSIS networks can be inefficient and have insufficient capacity. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

System and methods are provided for a high-capacity cable/DOCSIS network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 2B-2D depict SNR versus frequency plots for an example cable/DOCSIS network.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
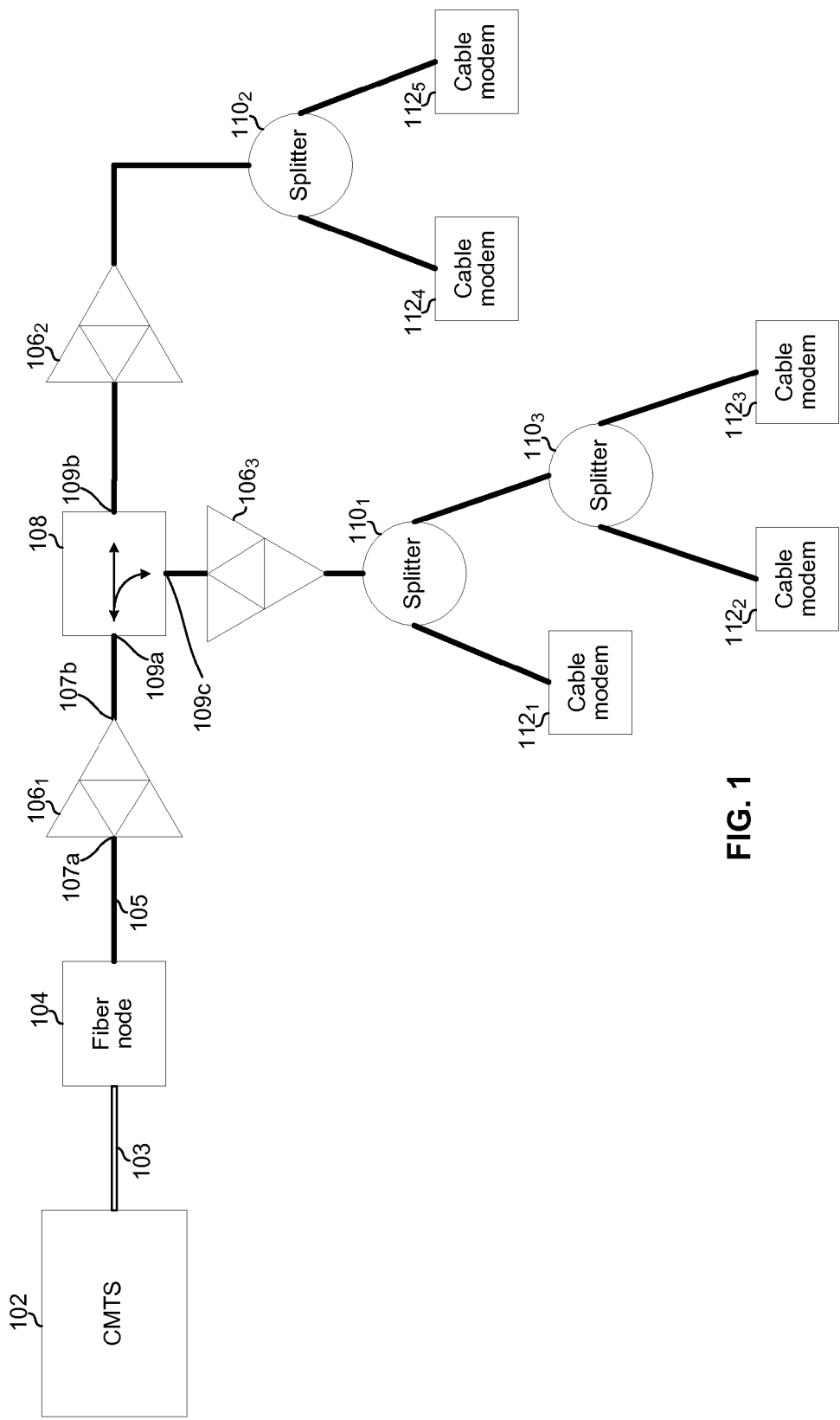
FIG. 1 is a diagram of an example cable/DOCSIS network.

FIG. 1 is a diagram of an example cable/DOCSIS network. The example network comprises a cable modem termination system (CMTS) 102, a fiber node 104, amplifiers $106_1$-$106_3$, a directional coupler 108, splitters $110_1$-$110_3$, and cable modems (CMs) $112_1$-$112_5$.

The CMTS 102 may comprise circuitry operable to manage connections to the CMs $112_1$-$112_5$. This may include, for example: participating in ranging operations to determine physical layer parameters used for communications between the CMTS 102 and CMs $112_1$-$112_5$; forwarding of dynamic host configuration protocol (DHCP) messages between a DHCP server and the CMs $112_1$-$112_5$; forwarding of time of day messages between a time of day server and the CMs $112_1$-$112_5$; directing traffic between the CMs $112_1$-$112_5$ other network devices (e.g., Ethernet interfaces of the CMTS 102 may face the Internet, Optical RF interfaces of the CMTS 102 may face the CMs, and the CMTS may direct traffic between and among the Ethernet and Optical RF interfaces); and managing registration of the CMs $112_1$-$112_5$ to grant the cable modems network (e.g., Internet) access. The registration process for a CM $112_X$ (X between 1 and 5 for the example network of FIG. 1) may comprise the CM $112_X$ sending a registration request along with its configuration settings, and the CMTS 102 accepting or rejecting the cable modem based on the configuration settings. The registration process may additionally comprise an exchange of security keys, certificates, or other authentication information.

The fiber node 104 may comprise circuitry operable to convert between optical signals conveyed via the fiber optic cable 103 and electrical signals conveyed via coaxial cable 105.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk" may be referred to as a "trunk amplifier." The amplifiers $106_2$ and $106_3$ which amplify signals along "branches" split off from the trunk may be referred to as "branch" or "distribution" amplifiers.

The directional coupler 108 may comprise circuitry operable to direct downstream traffic incident on interface 109a onto interfaces 109b and 109c, and to direct upstream traffic incident on interfaces 109b and 109c onto interface 109a. The directional coupler 108 may be a passive device.

Each of the splitters $110_1$-$110_3$ may comprise circuitry operable to output signals incident on each of its interfaces onto each of its other interfaces. Each of the splitters $110_1$-$110_3$ may be a passive device.

Each of the cable modems (CMs) $112_1$-$112_5$ may comprise circuitry operable to communicate with, and be managed by, the CMTS 1102 in accordance with one or more standards (e.g., DOCSIS). Each of the CMs $112_1$-$112_5$ may reside at the premises of a cable/DOCSIS subscriber.

The components (including, fiber optic cables, coaxial cables, amplifiers, directional couplers, splitters, and/or other devices between the CMTS 102 and the CMs $112_1$-$112_5$ may be referred to as a hybrid fiber coaxial (HFC) network. Any of the amplifiers, directional coupler, and splitters may be referred to generically as a coupling device.

Figure 2A:
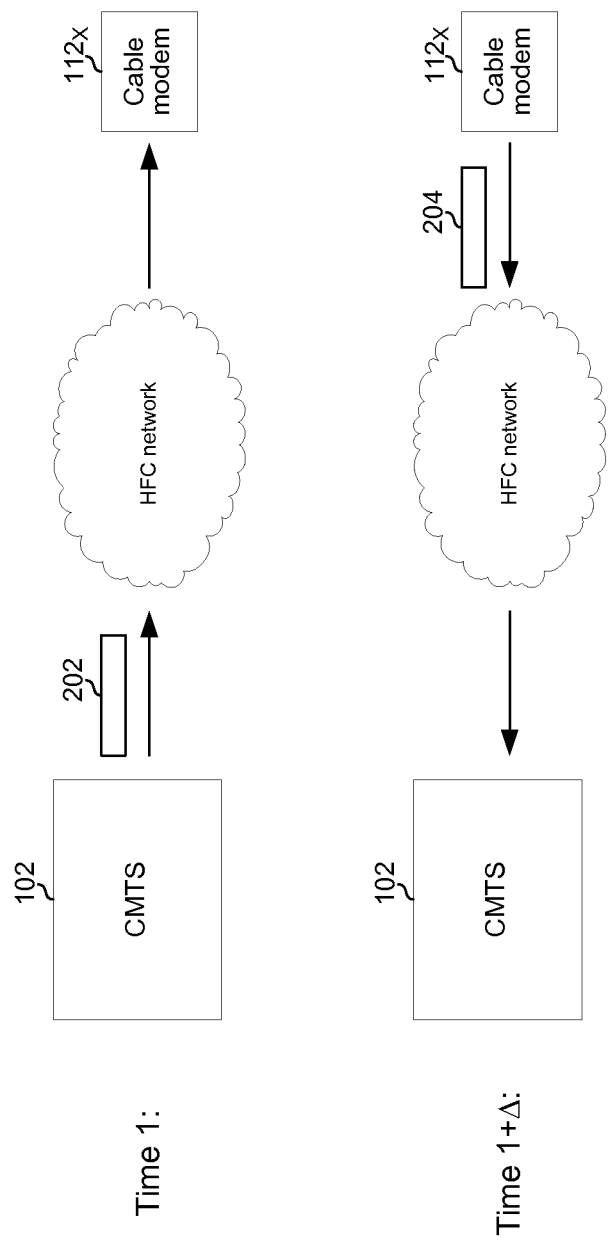
FIG. 2A depicts an example method of determining locations of CMs within the HFC network.

FIG. 2A depicts an example method of determining locations of CMs within the HFC network. Determining the locations may include determining one or more measured performance metrics for any particular CM 112X or group of CMs. A measured performance metric may be, for example, an SNR-related metric such as noise levels, strength of received desired signals, SNR at a particular frequency, SNR over a range of frequencies (an SNR profile), bit error rate, symbol error rate, and/or the like. Although various implementations using SNR-profile as the pertinent performance metric are described herein, other implementations may use a different metric. As shown in FIG. 2A, to determine one or more measured performance metric(s) for any particular CM $112_X$ or group of CMs, the CMTS 102 may transmit, at time 1, a message 202 that is destined (unicast, multicast, or broadcast) for the CM(s) and that functions as a probe to enable determination of the metric(s) for the CMs. The message 202 may be sent on multiple channels spanning multiple frequencies. Similarly, where OFDM is used for communications between the CMTS 102 and the CM(s), the message 202 may be transmitted on each subcarrier, or may be sent on a subset of subcarriers and then interpolation may be used for determining the metric(s) of subcarriers on which the message 202 was not sent.

The message 202 may be transmitted with such encoding, modulation, and transmit power such that even a CM $112_X$ with a worst-case performance metric(s) can receive the message and accurately measure the metric(s). In this regard, FIG. 2B shows a SNR versus frequency graph for an example HFC network that uses eight channels/subcarriers. The line 222 in FIG. 2B represents a composite worst-case SNR profile for one or more CM(s) in the HFC network to which the message 202 is destined. For example, line 222 may be a SNR profile for a single CM $112_X$ to which the message 202 is to be unicast. As another example, the line 222 may be a composite worst-case SNR profile for a plurality of CMs 112 of a particular service group to which the message 202 is to be multicast. As another example, the line 222 may be a composite worst-case SNR profile for all CMs of an HFC network handled by the CMTS 102 to which the message 202 is to be broadcast. The message 202 may be transmitted such that the minimum SNR needed to receive and accurately measure the SNR profile is below the line 222 (e.g., SNR needed for receiving the message 202 may be the line 224).

Upon receipt of the message 202, a CM $112_X$ may measure, over the channels/subbands on which the message was sent, one or more metrics (e.g., SNR versus frequency profile) for the transmission 202. The CM $112_X$ may then report the metric(s) back to the CMTS 102 via a message 204. In an example implementation, the message 202 may contain information about when and/or how the CM(s) are supposed to report their metric(s) (e.g., SNR profiles) back to the CMTS 102. In this regard, the message 202 may contain information that is the same as and/or or analogous to what may be found in a MAP, UCD, and/or other MAC management message defined in a DOCSIS standard. Accordingly, the message 202 may have specified a format of the message 204 and that the message 204 is to be transmitted at time T+Δ.

Once the metric(s) of one or more CM(s) are known to the CMTS 102, physical layer communication parameters to be used for communications between the CMTS 102 and the CM(s) may be determined based on the metric(s). Physical layer parameters may be configured/coordinated using upstream and/or downstream MAP messages, upstream channel descriptors (UCDs), other MAC management messages defined in DOCSIS protocols, and/or purpose-specific messages tailored to configuring the parameters based on one or more measured performance metric(s) as described in this disclosure. Physical layer communication parameters may be determined per CM based on each CM's respective metric(s) (e.g., each CM's SNR profile), per-service group based on a composite metric(s) of the CM(s) assigned to that service group (e.g., composite SNR profile for the CM(s) of that service group), per physical region of the HFC network based on a composite metric of the CMs located in that physical region (e.g., composite SNR profile for the CM(s) in that physical region), and/or the like. Furthermore, once the metric(s) of a CM $112_X$ is determined, the CMTS 102 may assign that CM $112_X$ to one or more service groups based on its metric(s). Example physical layer parameters include: encoding parameters, modulation parameters, transmit power, receive sensitivity, timeslot duration, channel(s) or subcarrier(s) on which to listen, channel(s) or subcarrier(s) on which to transmit, and/or the like. Example encoding parameters include: type of forward error correction (FEC) to be used (e.g., Reed-Solomon, LDPC, etc.), FEC block size, FEC code rate, etc. Example modulation parameters include: type of modulation (e.g., frequency shift keying (FSK), phase shift keying (PSK), quadrature amplitude modulation (QAM), etc.), modulation depth, modulation order, etc.

In an example implementation, the transmission of messages 202, the calculation of the metrics, such as an SNR profile, by the CM(s), the transmission 204, and subsequent configuration of physical layer parameters based on the metric(s) may take place in parallel with other operations performed during the registration/ranging process.

Referring now to FIG. 2C, there is again shown the line 222 which represents an applicable SNR profile (e.g., an individual SNR profile if configuring physical layer parameters per CM, a composite SNR profile for a service group if configuring physical layer parameters per service group, or a composite SNR profile for a particular physical region if configuring physical layer parameters based on physical location within the HFC network). Also shown is a line 226 corresponding to SNR utilization for communications with the CM(s) associated with the profile 222. Assuming the distance 228 is the minimum desired headroom (e.g., to allow for noise, etc.), then the physical layer communication parameters resulting in line 226 are nearly optimal in the sense that there is minimal headroom on each of channels/subbands 1, 3, 4, 6, 7, 8, and only slightly more than minimal headroom on channels/subbands 2 and 5.

Figure 2D:
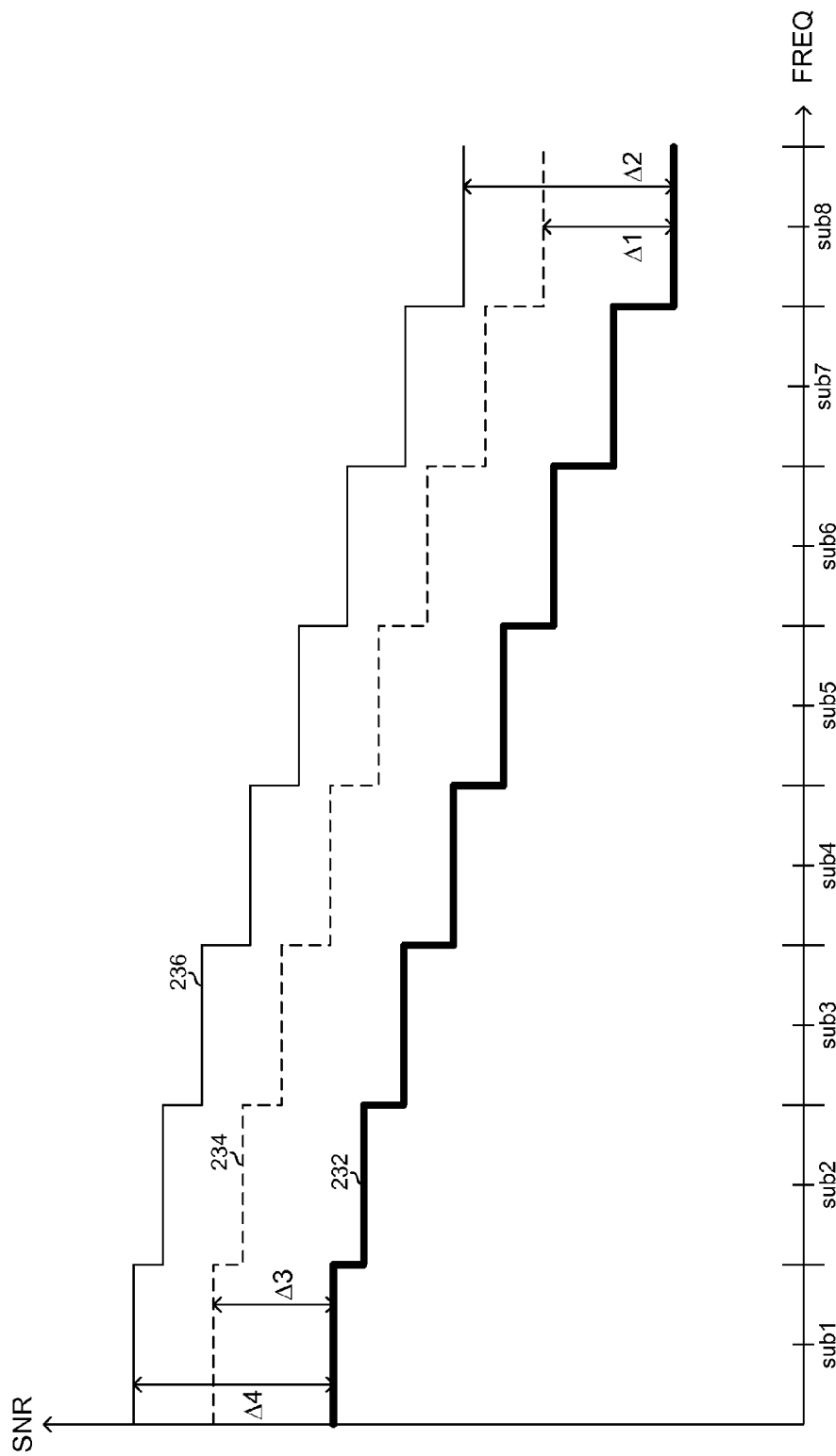

FIG. 2D illustrates example SNR profiles for the network of FIG. 1. The light solid line 236 represents the SNR profile of CM $112_1$, the dashed line 234 represents the SNR profiles of CMs $112_2$ and $112_3$ (which are assumed to be the same for simplicity of illustration), the heavy solid line 232 represents the reported SNR profiles of CMs $112_4$ and $112_5$ (which are assumed to be the same for simplicity of illustration). The SNR profiles of $112_4$ and $112_5$ may be lower than the others because, for example, higher device and/or cable losses (e.g., as a result of poor-performing coupling devices and/or longer cables). In an example implementation, given the profiles 232, 234, and 236, the CMTS 102 may reserve lower-frequency channels/subcarriers for communications with CMs $112_4$ and $112_5$ and may reserve higher-frequency channels/subcarriers for communications with from CMs $112_1$, $112_2$, and $112_3$. In this regard, in this example implementation, SNR falls off as the distance to the CMTS 102 increases and falls off faster at higher frequencies than at lower frequencies, resulting in $\Delta 2 > \Delta 4$ and $\Delta 1 > \Delta 3$. Thus, whereas the SNR of CMs $112_4$ and $112_5$ in channel/subcarrier 1 is only $\Delta 4$ less than the SNR of CM $112_1$ in channel/subcarrier 1, the SNR of CMs $112_4$ and $112_5$ in channel/subcarrier 8 is $\Delta 2$ less than the SNR of CM $112_1$ in channel/subcarrier 8. Thus, by using channel/subcarrier 8 for CM $112_1$ and channel/subcarrier 1 for CMs $112_4$ and $112_5$, there is a net SNR increase of $\Delta 2 - \Delta 4$ (i.e., communications to CM $112_1$ lose $\Delta 4$ in SNR but communications to CMs $112_4$ and $112_5$ gain $\Delta 2$ in SNR).

Figure 2E:
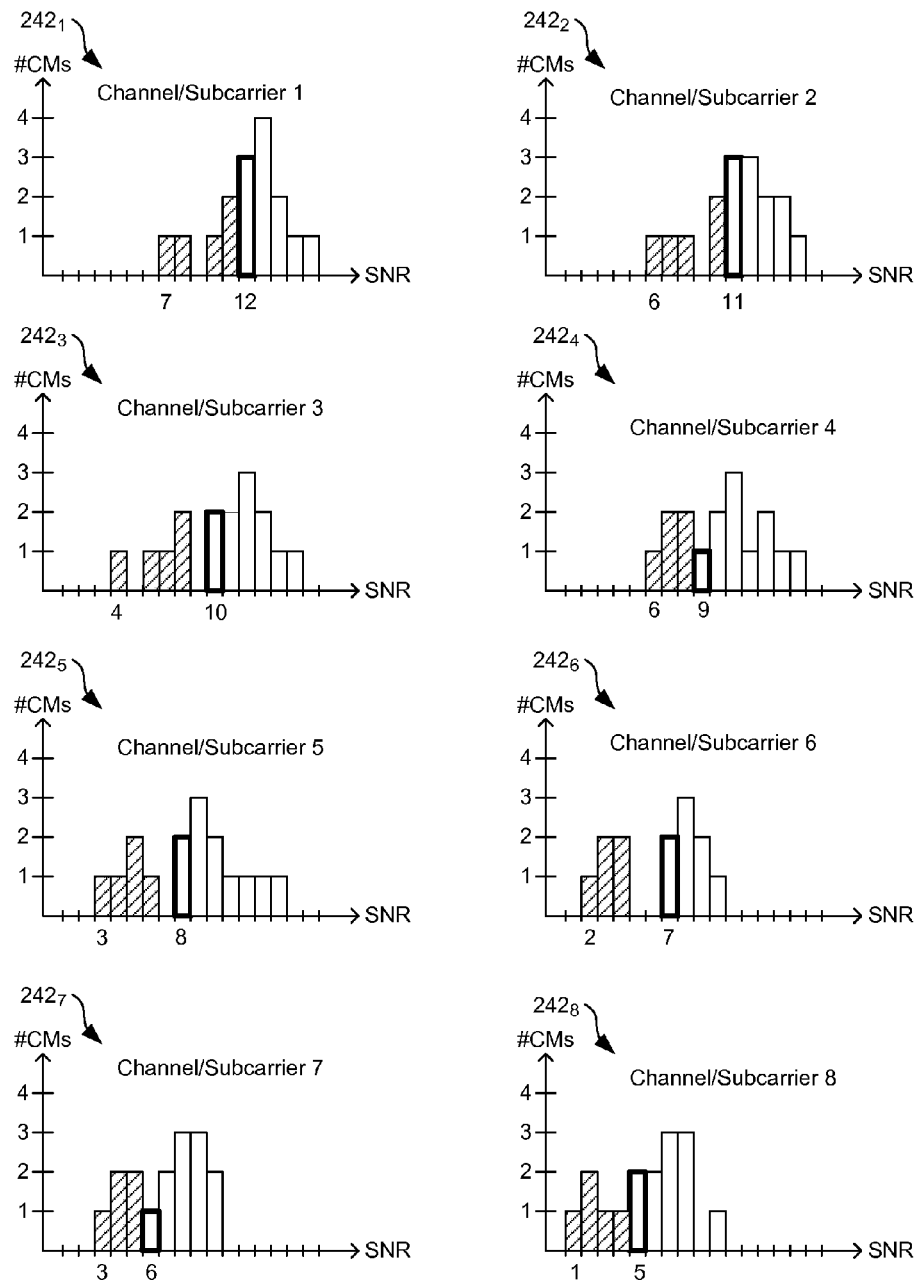
FIG. 2E depicts per-channel/subcarrier selection of communication parameters based on measured performance metrics of a plurality of cable modems.

FIG. 2E illustrates per-channel/subcarrier selection of communication parameters based on measured SNR (as an example of a measured performance metric) in an OFDM CATV network. Each of the graph $242_M$ (M between 1 and 8) is a histogram showing, for a hypothetical HFC network comprising 20 cable modems and using 8 channels/subcarriers, the number of CMs modems that reported each SNR value on subcarrier M. For simplicity of illustration, the SNR levels in FIG. 2E are normalized and range from 1 to 16 (the number 16 was chosen arbitrarily and is non-limiting). In the example implementation, the average SNR is relatively-high for low-frequency channels/subcarriers (the lowest-frequency being channel/subcarrier 1) and decreases as the frequency increases (the highest-frequency being channel/subcarrier 8). In other example implementations, noise, imperfections, and/or other characteristics of the CATV network may result in SNR measurements which do not necessarily decrease monotonically across channels/subcarriers.

The CMTS 102 may utilize the data corresponding to graphs $242_1$-$242_8$ shown when determining physical layer communication parameters to be used for each of the channels/subcarriers. In an example implementation, the physical layer parameters for a channel/subcarrier may be selected such that all CMs in the service group can successfully receive transmissions to the service group. Lower SNR may require, for example, lower modulation order, lower FEC code rate, and/or higher transmit power. In such an implementation, the graphs in FIG. 2E may result in the following selection of physical layer parameters: for subcarrier 1, parameters that enable reception with a tolerable amount of errors at an SNR of 7; for subcarrier 2, parameters that enable reception with a tolerable amount of errors at an SNR of 6; for subcarrier 3, parameters that enable reception with a tolerable amount of errors at an SNR of 4; for subcarrier 4, parameters that enable reception with a tolerable amount of errors at an SNR of 6; for subcarrier 5, parameters that enable reception with a tolerable amount of errors at an SNR of 3; for subcarrier 6, parameters that enable reception with a tolerable amount of errors at an SNR of 2; for subcarrier 7, parameters that enable reception with a tolerable amount of errors at an SNR of 3; for subcarrier 8, parameters that enable reception with a tolerable amount of errors at an SNR of 1.

In another example implementation, for each channel/subcarrier, the parameters may be selected such that reception on the subcarrier requires a value of a metric (e.g., SNR value) that a predetermined number or percentage of the CMs reported they are unable to achieve. In this manner, other CMs may receive higher throughput at the expense of some CMs having a higher number of receive errors. The errors for the CMs that have insufficient metric value for the selected parameters may be compensated through unicast and/or multicast transmission of replacement data and/or additional error correction bits as discussed below. For example, assuming that it is acceptable for five of the sixteen CMs in FIG. 2E to fall below the threshold SNR value corresponding to the selected physical layer parameters, the graphs in FIG. 2E may result in the following selection of physical layer parameters: for subcarrier 1, parameters that enable reception with a tolerable amount of errors at an SNR of 12; for subcarrier 2, parameters that enable reception with a tolerable amount of errors at an SNR of 11; for subcarrier 3, parameters that enable reception with a tolerable amount of errors at an SNR of 10; for subcarrier 4, parameters that enable reception with a tolerable amount of errors at an SNR of 9; for subcarrier 5, parameters that enable reception with a tolerable amount of errors at an SNR of 8; for subcarrier 6, parameters that enable reception with a tolerable amount of errors at an SNR of 7; for subcarrier 7, parameters that enable reception with a tolerable amount of errors at an SNR of 6; for subcarrier 8, parameters that enable reception with a tolerable amount of errors at an SNR of 5.

In an example implementation, hierarchical modulation may be used with coarse bits/most significant bits (MSBs) used for sensitive and/or critical information (e.g., control messages such as upstream and/or downstream MAPS, sync messages, packet headers, I frames of an MPEG stream, and/or the like) and finer bits/least significant bits (LSBs) used for less sensitive information (e.g., B frames of an MPEG stream). In an example implementation, hierarchical modulation may be used with coarse bits or MSBs utilized for broadcast messages and finer bits or LSBs used for unicast and/or multicast messages to those CMs that have sufficient metric value(s) (e.g., SNR value) to detect the finer bits. In an example implementation, hierarchical modulation may be used where MSBs and LSBs are transmitted on subcarriers that have higher SNR and only MSBs may be transmitted on subcarriers which have lower SNR. Subcarriers on which hierarchical modulation is used may be those subcarriers for which the disparity between best-case SNR (e.g., SNR reported by a CM that is closest to the CMTS) and worst-cast SNR (e.g., SNR reported by CM that is furthest from the CMTS, that is on a particularly noisy branch, that is behind a defective cable or coupling element, etc.) is above a threshold.

Figure 3:
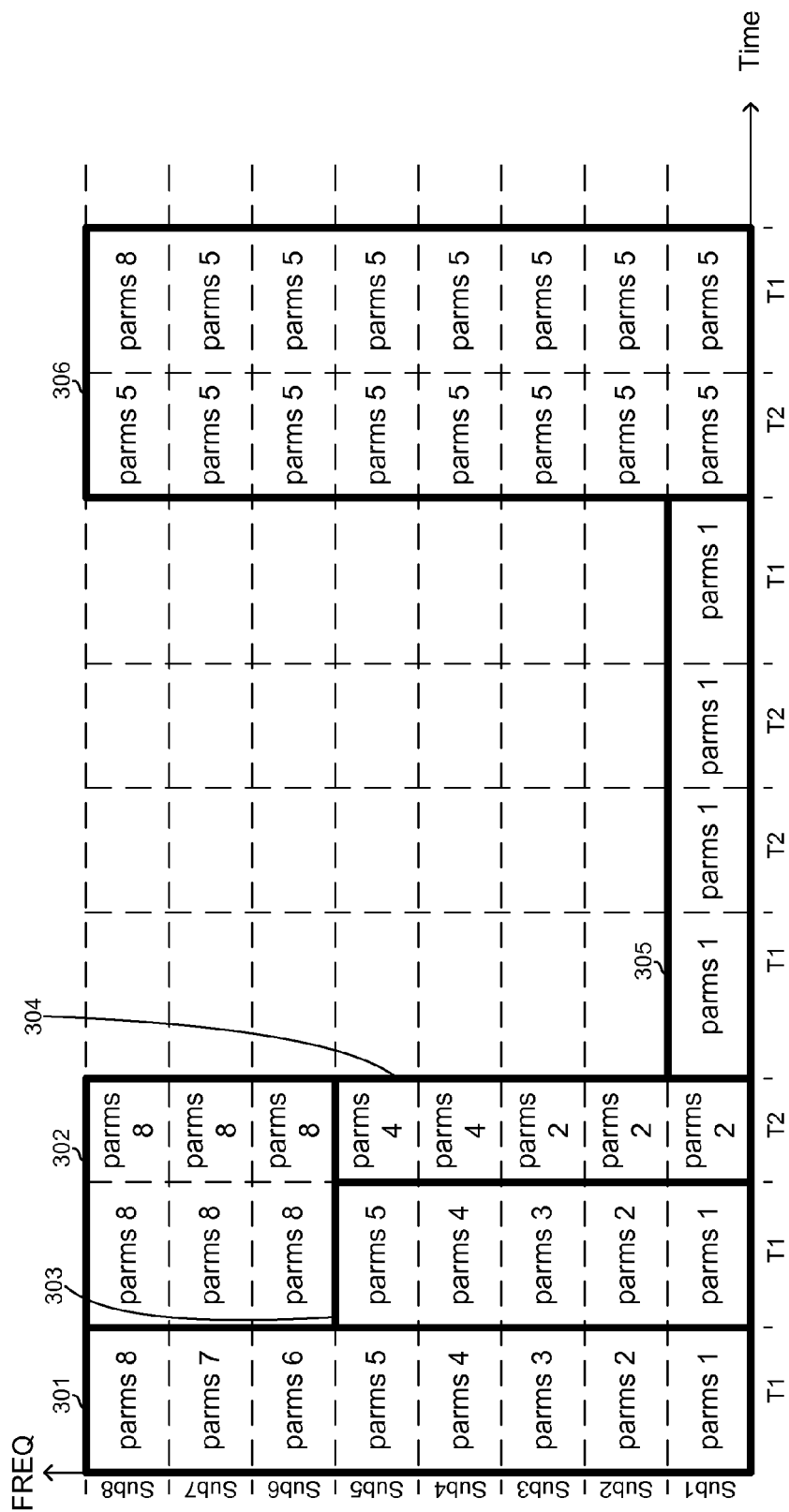
FIG. 3 illustrates example transmissions in an OFDM cable/DOCSIS network in which different values of one or more physical layer communication parameters can be used for different transmissions.

FIG. 3 illustrates example transmissions in an OFDM cable/DOCSIS network in which different values of one or more physical layer communication parameters can be used for different transmissions. The transmissions shown may be coordinated using, for example, upstream and/or downstream DOCSIS MAP messages. The duration of the timeslot and/or which timeslot a transmission is scheduled for may be controlled based on latency requirements of the transmission and/or other transmissions in the network.

The transmission 301, which may be to and/or from one or more CM(s) of a first service group, uses all subcarriers, a timeslot of duration T1, and different physical layer parameters ("parms M" where M corresponds to the subcarrier index) for each of the eight subcarriers. The transmission 302, which may be to and/or from one or more CM(s) of a second service group, uses only the three highest-frequency subcarriers, a timeslot of duration T1+T2, and uses the same physical layer parameters ("parms 8") on each of the three subcarriers. The transmission 303 uses the lower five subcarriers, a timeslot of duration T1, and a different set of physical layer parameters ("parms M" where M corresponds to the subcarrier index) on each of the five subcarriers. The transmission 304 uses the lower five subcarriers, a timeslot of duration T2, and a two sets of physical layer parameters ("parms 4" and "parms 2"). The transmission 305 uses only the lowest frequency subcarrier, a timeslot of duration 2T1+2T2, and a single set of physical layer parameters. During time interval over which transmission 305 takes place, circuitry of the CMTS 102 and/or the CMs which may be required for receiving on the seven higher-frequency subcarriers may be powered down to conserve energy. The transmission 406 uses the all of the subcarriers, a timeslot of duration T2+T1, and the same physical layer parameters ("parms 5") on each of the subcarriers.

In an example implementation, the physical layer parameters may be configured to enable sleep duty cycling of CMs and/or other components of the network. For example, the physical layer parameters may be configured to maximize throughput while minimizing transmission time such that more time can be spent in a sleep/low-power mode.

Figure 4:
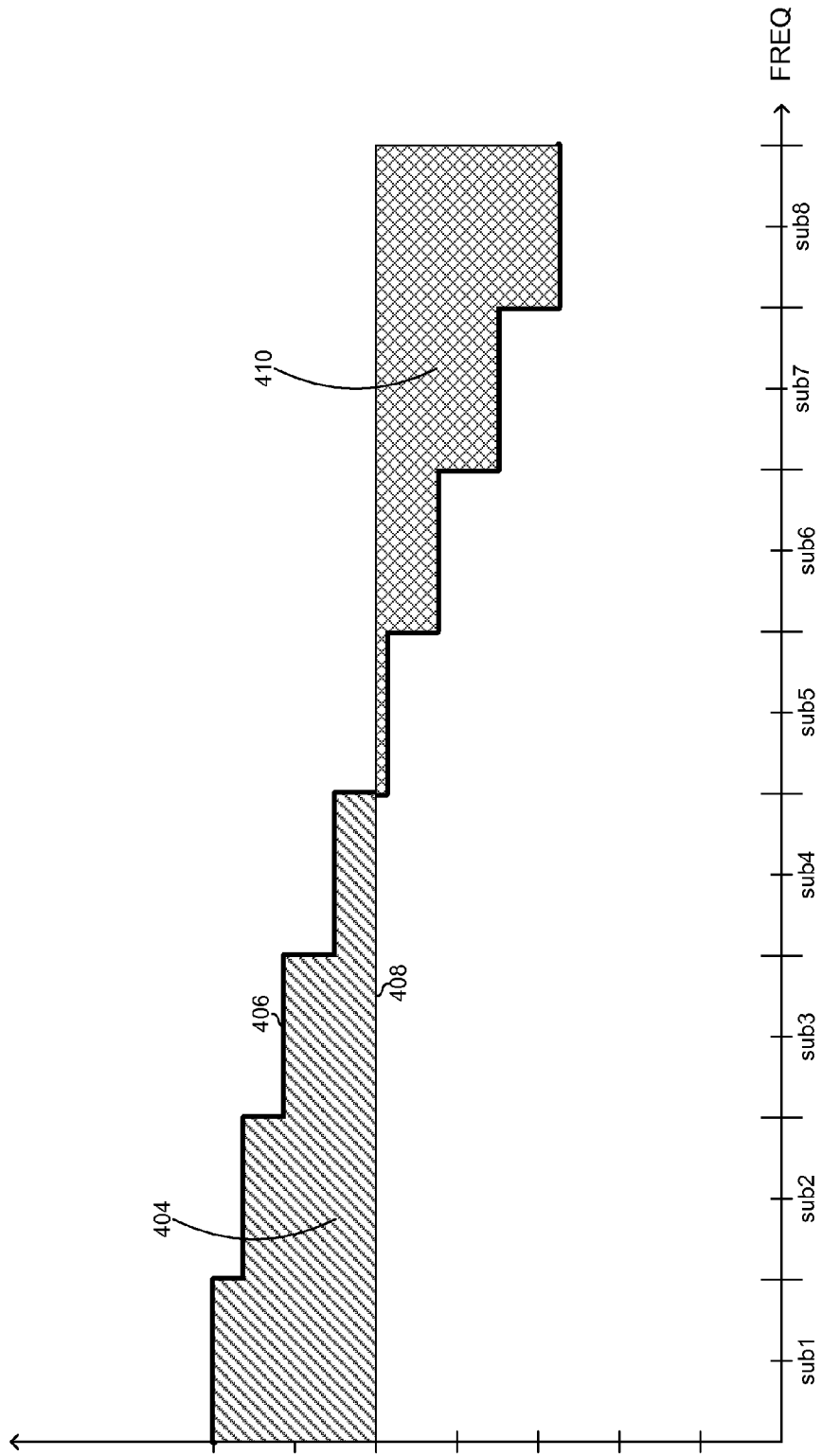
FIG. 4 illustrates an example implementation in which error-correcting bits are sent on higher-SNR subcarriers to compensate for reception errors on lower-SNR subcarriers.

FIG. 4 illustrates an example implementation in which error-correcting bits are sent on higher-SNR subcarriers to compensate for reception errors on lower-SNR subcarriers. In FIG. 4, the line 406 corresponds to the SNR profile of a cable modem $112_X$, and line 408 corresponds to the SNR required on each subcarrier in order to successfully receive broadcast transmissions (i.e., receive with a tolerable number of errors). For simplicity of illustration, the required SNR is flat across the subcarriers. In the implementation depicted, CM $112_X$ has excess SNR in channels/subcarriers 1-4 (the excess capacity corresponding to area 404), but has inadequate SNR in channels/subcarrier 5-8 (the capacity deficit corresponding to area 410). Consequently, data received on channel/subcarriers 5-8 may have unacceptably high error rates. To compensate for the deficiency on channels/subcarriers 5-8, replacement data and/or additional parity bits for the packets transmitted on subcarriers 5-8 may be transmitted on subcarriers 1-4 (e.g., in the form of a unicast transmission, or multicast transmission where other CMs also have a deficit on the same subcarriers). CM $112_X$ may receive a broadcast packet, process the broadcast packet to recover a portion of a message, receive a unicast or multicast packet containing an additional and/or replacement portion(s) of the message, process the unicast and/or multicast packet to recover the additional and/or replacement portion(s), and combine the additional and/or replacement portions with the portion recovered from the broadcast packet to reconstruct the message with an acceptable number of errors.

In an example implementation, a cable modem termination system (CMTS) (e.g., 102) may communicate with a plurality of cable modems (e.g., $112_1$-$112_5$) using a plurality of orthogonal frequency division multiplexed (OFDM) subcarriers (e.g., subcarriers 1-8 of FIG. 4). The CMTS may determine a performance metric of each of the cable modems. For each one of the plurality of OFDM subcarriers and each one of the cable modems, the CMTS may select physical layer parameters to be used for communication with the one of the cable modems on the one of the OFDM subcarriers based on a performance metric of the one of the cable modems. Parameters may be selected for each individual cable modem (e.g., a separate selection for each of CMs $112_1$-$112_5$) or for groups of cable modems (e.g., a first selection for CMs $112_1$-$112_3$ and a second selection for CMs $112_4$ and $112_5$). The performance metric may be a signal-to-noise ratio (SNR) profile across the OFDM subcarriers. The plurality of cable modems may belong to a single service group, and the physical layer parameters may be selected such that a threshold SNR required for receiving a packet broadcast to the service group is higher than a subset of the SNR profiles corresponding to a subset of the cable modems. The contents of the broadcast packet may be fully or partially retransmitted to the subset of modems in a unicast or multicast packet.

Continuing with this example implementation, the selecting the physical layer parameters may include selecting whether to use hierarchical modulation for communication with the one of the cable modems. The CMTS may select use of hierarchical modulation for a particular one of the OFDM subcarriers when a difference between a performance metric measured for a first one of the cable modems on the particular one of the OFDM subcarriers and a the performance metric measured for a second one of the cable modems on the particular one of the OFDM subcarriers is greater than a predetermined amount. The CMTS may communicate with the cable modems using hierarchical modulation, wherein both of more significant bits and less significant bits are transmitted on a first subset of the OFDM subcarriers for which each of the modems has a relatively-high value of a performance metric, and only more significant bits are transmitted on a second subset of the OFDM subcarriers for which one or more of the modems has a relatively-low of a performance metric.

Continuing with this example implementation, the CMTS may select the physical layer parameters such that there is excess capacity on a first subset of the OFDM subcarriers and a capacity deficit on a second set of the OFDM subcarriers. The CMTS may transmit, on the first subset of the OFDM subcarriers, parity bits for packets sent on the second subset of the OFDM subcarriers. The CMTS may transmit, on the first subset of the OFDM subcarriers, replacement bits for packets sent on the second subset of the OFDM subcarriers. The physical layer parameters may include one or more of: transmit power, receive sensitivity, timeslot duration, modulation type, modulation order, forward error correction (FEC) type, and FEC code rate.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a high capacity CATV network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a cable modem termination system (CMTS) which communicates with a plurality of cable modems using a plurality of orthogonal frequency division multiplexed (OFDM) subcarriers, wherein said plurality of cable modems belong to a single service group:
   determining a plurality of values of a performance metric, each one of said plurality of values of said performance metric corresponding to a respective one of said plurality of cable modems and a respective one of said OFDM subcarriers;
   for each one of said plurality of OFDM subcarriers, selecting physical layer parameters to be used for communication with said service group on said one of said OFDM subcarriers based on said plurality of values of said performance metric;
   broadcasting a packet to said service group, wherein a threshold value of said performance metric required for reception of said packet is higher than a subset of said plurality of values of said performance metric, wherein the subset of said plurality of values corresponds to a subset of said plurality of modems; and
   partially or fully retransmitting contents of said packet to said subset of said modems in a unicast or multicast packet.

2. The method of claim 1, wherein:
   said performance metric is signal-to-noise ratio (SNR); and
   said plurality of values of said performance metric form a plurality of SNR profiles, each of said plurality of SNR profiles corresponding to a respective one of said plurality of cable modems.

3. The method of claim 1, wherein a portion of a message recovered from said packet broadcast to said service group is combined, in said subset of said plurality of cable modems, with a portion of said message recovered from said unicast or multicast packet to reconstruct said message.

4. The method of claim 1, wherein said selecting said physical layer parameters includes selecting whether to use hierarchical modulation for communication with said plurality of cable modems.

5. The method of claim 4, comprising selecting to use hierarchical modulation for a particular one of said OFDM subcarriers when a difference between a value of said performance metric measured for a first one of said plurality of cable modems on said particular one of said OFDM subcarriers and a value of said performance metric measured for a second one of said plurality of cable modems on said particular one of said OFDM subcarriers is greater than a predetermined amount.

6. The method of claim 4, comprising communicating with said plurality of cable modems using hierarchical modulation, wherein:
   both of more significant bits and less significant bits are transmitted on a first subset of said OFDM subcarriers for which each of said plurality of cable modems has a relatively-high value of said performance metric; and
   only more significant bits are transmitted on a second subset of said OFDM subcarriers for which one or more of said plurality of cable modems has a relatively-low value of said performance metric.

7. The method of claim 1, comprising selecting said physical layer parameters such that there is excess capacity on a first subset of said OFDM subcarriers and a capacity deficit on a second set of said OFDM subcarriers.

8. The method of claim 1, comprising transmitting, on a first subset of said OFDM subcarriers, parity bits for packets sent on a second subset of said OFDM subcarriers.

9. The method of claim 1, comprising transmitting, on a first subset of said OFDM subcarriers, replacement bits for packets sent on a second subset of said OFDM subcarriers.

10. The method of claim 1, wherein said physical layer parameters include one or more of: transmit power, receive sensitivity, timeslot duration, modulation type, modulation order, forward error correction (FEC) type, and FEC code rate.

11. A system comprising:
   a cable modem termination system (CMTS) operable to:
   communicate with a plurality of cable modems using a plurality of orthogonal frequency division multiplexed (OFDM) subcarriers, wherein said plurality of cable modems belong to a single service group;
   determine a plurality of values of a performance metric, each one of said plurality of values of said performance metric corresponding to a respective one of said plurality of cable modems and a respective one of said OFDM subcarriers;
   for each one of said plurality of OFDM subcarriers, select physical layer parameters to be used for communication with said service group on said one of said OFDM subcarriers based on a plurality of values of said performance metric;
   broadcast a packet to said service group, wherein a threshold value of said performance metric required for reception of said packet is higher than a subset of said plurality of values of said performance metric, wherein the subset of said plurality of values corresponds to a subset of said plurality of modems; and partially or fully retransmit contents of said packet to said subset of said modems in a unicast or multicast packet.

12. The system of claim 11, wherein:

said performance metric is signal-to-noise ratio (SNR); and said plurality of values of said performance metric form a plurality of SNR profiles, each of said plurality of SNR profiles corresponding to a respective one of said plurality of cable modems.

13. The system of claim 11, wherein said selecting said physical layer parameters includes selecting whether to use hierarchical modulation for communication with said plurality of cable modems.

14. The system of claim 13, wherein said CMTS is operable to select use of hierarchical modulation for a particular one of said OFDM subcarriers when a difference between a value of said performance metric measured for a first one of said plurality of cable modems on said particular one of said OFDM subcarriers and a value of said performance metric measured for a second one of said plurality of cable modems on said particular one of said OFDM subcarriers is greater than a predetermined amount.

15. The system of claim 13, wherein said CMTS is operable to communicate with said plurality of cable modems using hierarchical modulation, wherein:

both of more significant bits and less significant bits are transmitted on a first subset of said OFDM subcarriers for which each of said plurality of cable modems has a relatively-high value of said performance metric; and only more significant bits are transmitted on a second subset of said OFDM subcarriers for which one or more of said plurality of cable modems has a relatively-low value of said performance metric.

16. The system of claim 11, wherein said CMTS is operable to select said physical layer parameters such that there is excess capacity on a first subset of said OFDM subcarriers and a capacity deficit on a second set of said OFDM subcarriers.

17. The system of claim 11, wherein said CMTS is operable to transmit, on a first subset of said OFDM subcarriers, parity bits for packets sent on a second subset of said OFDM subcarriers.

18. The system of claim 11, wherein said CMTS is operable to transmit, on a first subset of said OFDM subcarriers, replacement bits for packets sent on a second subset of said OFDM subcarriers.

19. The system of claim 11, wherein said physical layer parameters include one or more of: transmit power, receive sensitivity, timeslot duration, modulation type, modulation order, forward error correction (FEC) type, and FEC code rate.

20. The system of claim 11, wherein a portion of a message recovered from said packet broadcast to said service group is combined, in said subset of said plurality of cable modems, with a portion of said message recovered from said unicast or multicast packet to reconstruct said message.

21. A system comprising:

a cable modem termination system (CMTS) operable to:

communicate with a plurality of cable modems using a plurality of orthogonal frequency division multiplexed (OFDM) subcarriers;

select to use hierarchical modulation for a particular one of said OFDM subcarriers when a difference between a value of a performance metric measured for a first one of said plurality of cable modems on said particular one of said OFDM subcarriers and a value of said performance metric measured for a second one of said plurality of cable modems on said particular one of said OFDM subcarriers is greater than a predetermined amount; and select to use non-hierarchical modulation for said particular one of said OFDM subcarriers otherwise.

22. A system comprising:

a cable modem termination system (CMTS) operable to:

communicate with a plurality of cable modems using hierarchical modulation and a plurality of orthogonal frequency division multiplexed (OFDM) subcarriers, wherein:

both of more significant bits and less significant bits are transmitted on a first subset of said OFDM subcarriers for which each of said plurality of cable modems has a relatively-high value of a performance metric; and only more significant bits are transmitted on a second subset of said OFDM subcarriers for which one or more of said plurality of cable modems has a relatively-low value of said performance metric.

\* \* \* \* \*

UNITED STATES PATENT AND TRADEMARK OFFICE
CERTIFICATE OF CORRECTION

| | | |
|---|---|---|
| PATENT NO. | : 9,178,765 B2 | Page 1 of 1 |
| APPLICATION NO. | : 13/948401 | |
| DATED | : November 3, 2015 | |
| INVENTOR(S) | : Ling et al. | |

It is certified that error appears in the above-identified patent and that said Letters Patent is hereby corrected as shown below:

On the title page item [73], insert -- MAXLINEAR, INC. -- delete "MAXLINER, INC."

Signed and Sealed this
Nineteenth Day of April, 2016

Michelle K. Lee
*Director of the United States Patent and Trademark Office*